Feb. 12, 1963  H. E. TODD ETAL  3,077,139
APPARATUS FOR AIMING HEADLAMPS
Filed May 9, 1958  3 Sheets-Sheet 1

INVENTORS
Harold E. Todd, &
BY George W. Onksen

R. F. Barnard
ATTORNEY

INVENTORS
Harold E. Todd, &
BY George W. Onksen

R. R. Barnard
ATTORNEY

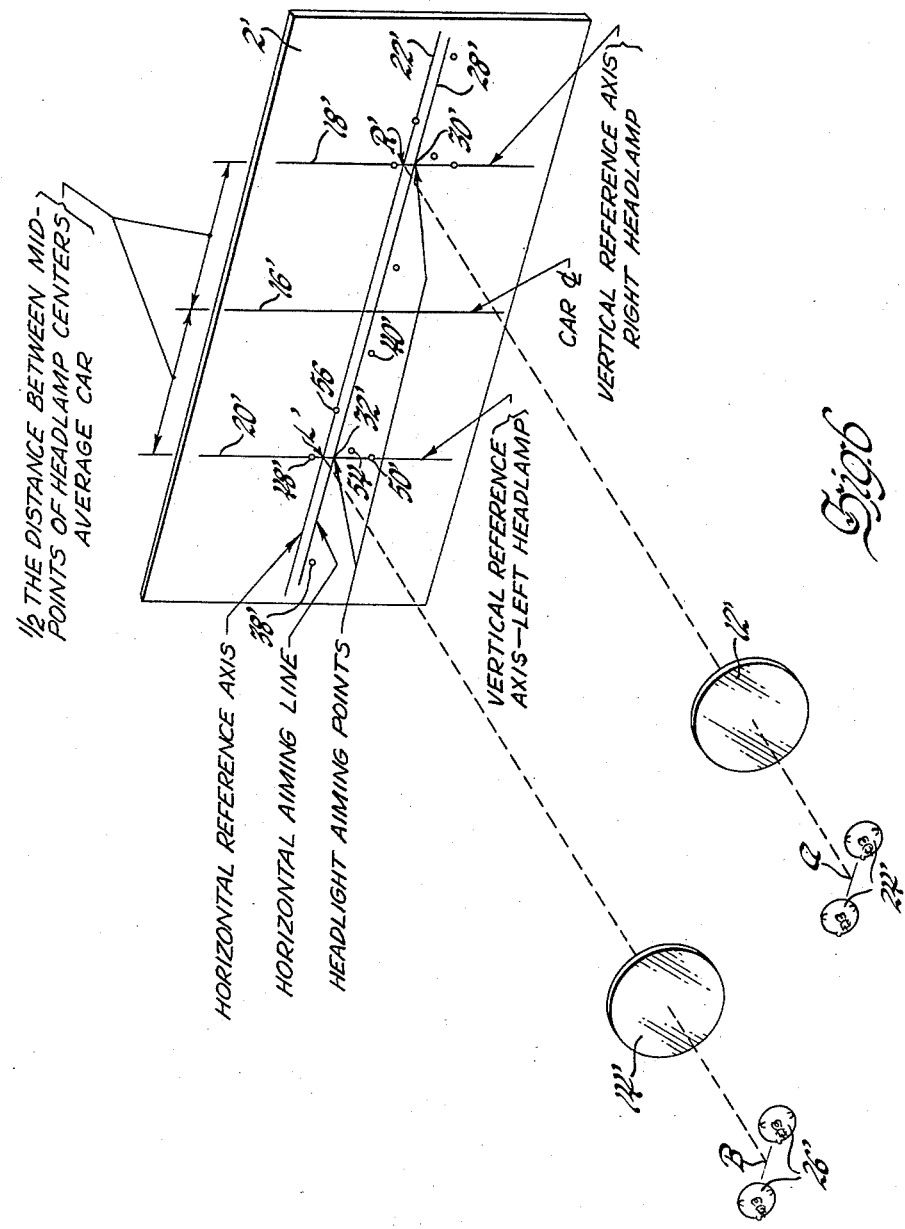

či
Patented Feb. 12, 1963

1

3,077,139
APPARATUS FOR AIMING HEADLAMPS
Harold E. Todd and George W. Onksen, Anderson, Ind., assignors to General Motors Corporation, Detroit, Mich., a corporation of Delaware
Filed May 9, 1958, Ser. No. 734,360
2 Claims. (Cl. 88—14)

The present invention relates to apparatus for optically aiming headlamps and, more particularly, to such apparatus adapted primarily for use in an automotive assembly plant in which two or more models of vehicles are assembled having headlamps which vary in vertical height or horizontal spacing or both.

In automotive vehicle assembly plants, it has been the conventional practice, after final assembly of a particular vehicle, to transport the vehicle to an aiming station in which the headlamps thereof can be properly aimed in conformity to the lighting regulations of the various local governments. In the past years, much effort has been expended under the auspices of the Society of Automotive Engineers to regulate and standardize headlamp aiming procedures to insure conformity with the aforementioned regulations. As a result, the majority if not all of the major automotive assembly plants aim vehicle headlamps according to the lighting inspection code and recommended practice for lamp aim inspection of the Society of Automotive Engineers.

As an example of these S.A.E. recommendations, reference may be made to the recommendations for the aim of the symmetrical headlamp beam pattern of a conventional seven inch sealed lamp illuminated with the latter on upper beam. The aforementioned seven inch sealed lamp units may be distinguished from the most recent development in vehicle lighting commonly referred to as dual headlamps which include a pair of five and three-quarter inch sealed lamp units on each side of the vehicle; that is, the seven inch sealed lamp unit is the type which heretofore has been commonly used in automotive vehicle lighting in which a single lamp was positioned on each side of the vehicle. The S.A.E. recommended practice for aim inspection of the aforementioned seven inch sealed lamp unit requires that the vehicle equipped with the lamps be positioned on a level floor with the headlamps twenty-five feet from an aiming screen on which there are provided coordinate reference axes for each headlamp of the vehicle. Heretofore, these coordinate axes have included a vertical axis through each of the lamp centers, and a horizontal axis corresponding to the height of the lamp center. With a particular vehicle disposed with respect to an aiming screen as aforedescribed, it is the S.A.E. recommendation that, first, approval shall be refused if the center of the upper beam high intensity zone of the seven inch headlamp is more than six inches to the right or left of straight ahead which corresponds to the aforementioned vertical reference axis, and, secondly, approval shall be refused if the center of the upper beam high intensity zone of the seven inch unit is aimed higher or lower than two inches before the lamp center level which corresponds to the horizontal reference axis aforedescribed. The tolerance for this inspection is plus or minus two inches.

With these or, as is sometimes the case, more narrow tolerances in mind, it has been the conventional practice to position a vehicle as aforedescribed and thereafter adjust the respective headlamps until such time as the upper beam high intensity zone has been visually or electronically noted to fall within the tolerance area on the aiming screen. However, a relatively serious difficulty is encountered when successive vehicles are equipped with headlamps having varying horizontal spacing and which vary in their vertical heights such as is to be found in an assembly plant in which two or more models of vehicles are being assembled. In such instances, it will be readily apparent that the aforedescribed vertical and horizontal reference axes will not be properly related to the headlamps of successive vehicles. Consequently, in such circumstances, it has been necessary to provide a movably mounted aiming screen for each of the vehicle headlamps. Each aiming screen is then properly positioned so that the coordinate reference axes thereon are properly related as aforementioned with a corresponding vehicle headlamp and the latter is then aimed. However, upon a successive model of vehicle being installed in the aiming station, and which vehicle has headlamps which are spaced in a manner different from the previous vehicle, it is then necessary to move the aiming screens closer or farther apart horizontally and to lift or lower them to properly relate their coordinate reference axes to the headlamps of the vehicle then in the station. As would be suspected, such a procedure is quite inefficient and uneconomical particularly when it is remembered that these vehicles are assembled at a very rapid rate according to modern techniques of mass production. Moreover, it is not at all unusual for two or more models of vehicles to be interspersed along a production line wherein only one or at best a few of a particular model of vehicle will come off the assembly line as a group at any one particular time. Consequently, the operators of the lamp aiming station are constantly rearranging the aiming screens to provide the proper vehicle headlamp aim.

It is, therefore, a principal object, feature and advantage of this invention to provide apparatus for optically aiming vehicle headlamps which does not require readjustment of the aiming setup and particularly the aiming screen thereof to accommodate successive vehicles having a different headlamp spacing or headlamps at different heights.

It is a more specific object and feature of this invention to provide apparatus for aiming the headlamps of successive vehicles coming from a factory assembly line, and which apparatus comprises a stationary aiming screen having respective sets of coordinate reference axes thereon corresponding to the headlamps on each side of the vehicle, and an optical mechanism disposed between each set of the coordinate reference axes and a respective side of the vehicle which carries the headlamp or headlamps whereby the optical mechanisms will compensate for variation in vertical height and relative horizontal spacing in the headlamps of successive vehicles while giving proper aim thereof.

It is yet a more specific object and feature of this invention to provide apparatus of aiming the headlamps of successive vehicles of the type aforedescribed including an optical mechanism in which the optical axis of the mechanism is aligned with respective reference points on the aiming screen which are related in a predetermined manner to the average position of lamp centers on the vehicles in question.

It is another object and feature of this invention to provide apparatus for aiming the headlamps of successive vehicles in which the aforementioned optical mechanisms each consist of a relatively large condensing lens which is spaced from a reference point on the aiming screen a distance equal to its focal length whereby a portion of the beam of each of the vehicle headlamps will be redirected by the condensing lenses to a portion of the aiming screen relative to the reference points thereon according to the relation of such beam direction to the optical axis of the condensing lens as it falls on and passes through the lens, and irrespective of variation in position of the headlamps within relatively large tolerances.

In general, these and other objects of this invention are attained by providing a vertical aiming screen fixedly positioned on a substantially level floor and spaced a predetermined distance in front of the headlamps of a vehicle mounted at a suitable station. In this instance, this distance is equal to twenty-five feet according to the S.A.E. recommendations for the aim of a vehicle headlamp. The vehicle station is provided with suitable mounting pads or other devices to insure that the center lines of successive vehicles may be aligned with a datum axis on the aiming screen such as the center thereof. Coordinate reference axes comprising a vertical and horizontal axis are placed on the aiming screen to either side of the center line of the vehicle. With respect to aiming the aforementioned seven inch sealed lamp units, the respective vertical axes of each pair of coordinate axes are positioned, respectively, to either side of the vertical center line of the car a distance equal to one-half the average distance between headlamp centers for the various vehicles in question. Similarly, the horizontal reference axis corresponds to the average lamp center level for the vehicles in question. A reference point is then defined on the aiming screen by the intersection of each set of coordinate axes. From the above description, it will be quite clear that this reference point is, in effect, the projection on the aiming screen of the average position of the centers of the lamps to be aimed.

An aiming point may then be established on the aiming screen with respect to each reference point. For example, and with reference to the aforementioned recommendations for the aim of a seven inch sealed lamp unit on upper beam, the high intensity zone of the upper beam patterns from the two headlamps will be symmetrical relative to the respective vertical reference axes, but should not be aimed higher or lower than two inches below the lamp center level, within the aforementioned tolerances, which corresponds to the horizontal reference axis. This latter specification results in a horizontal aiming line two inches below and parallel to the average lamp center level line which corresponds to the aforementioned horizontal reference axis. Consequently, the intersection of the horizontal aiming line and the vertical reference axis establishes the aforementioned aiming point on which the high intensity zone of the symmetrical upper beam pattern is to be projected at twenty-five feet.

A relatively large condensing lens, in this instance preferably eighteen inches in diameter and having a twenty-two foot focal length, is then installed between each reference point on the screen and the respective vehicle headlamps. Each condensing lens is mounted three feet from the face of a headlamp lens with its optical axis aligned with the associated reference point on the screen. Consequently, it will be noted that each of the condensing lenses is spaced twenty-two feet from the reference point on the screen or a distance equal to its focal length. Thereafter, the vehicle headlamps may be illuminated and, through the light condensing function of the respective condensing lenses, will provide proper vehicle aim both vertically and horizontally irrespective of variation in horizontal spacing or vertical heights of the headlamps in successive vehicles.

The aforementioned apparatus and the method employed therewith in aiming headlamps will become more fully apparent hereinafter as the description of the invention proceeds, and in which reference is made to the following drawings in which.

Figure 1:
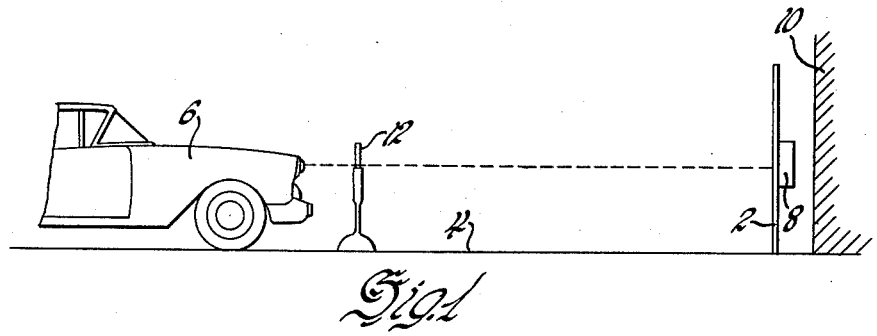
FIGURE 1 is a side elevational view of a suitable aiming station, and particularly an aiming station in an assembly plant, which illustrates the arrangement of the apparatus of this invention in aiming seven inch headlamps.
Figure 2:
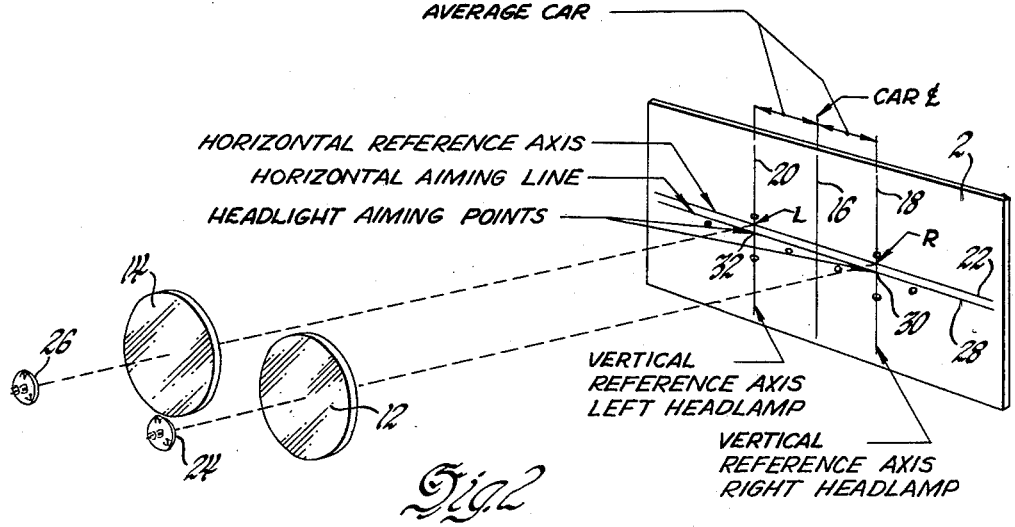
FIGURE 2 is a perspective slightly enlarged view of FIGURE 1 diagrammatically illustrating the relation of the apparatus of FIGURE 1.
Figure 5:
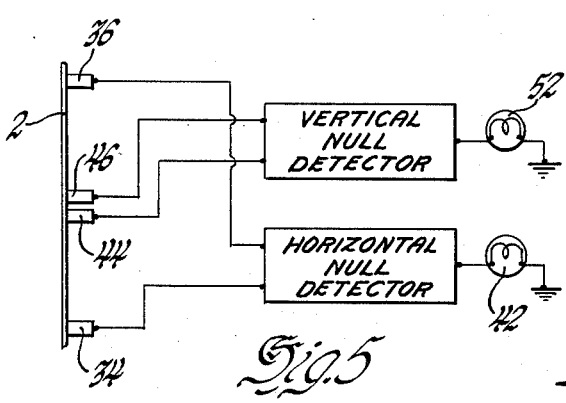

FIGURE 5 is a diagrammatic view corresponding generally to a top plan view of the aiming screen of FIGURE 1 illustrating one form of electronic light measuring apparatus which may be alternately employed with visual aiming of the vehicle headlamps; and FIGURE 6 is a view similar to FIGURE 2, but which illustrates the arrangement of the apparatus and use of the method in aiming dual or other multiple lamp systems.

In the interest of clarity and in order to avoid confusion, the following description will be made with particular reference to FIGURES 1 to 5 and the aforementioned seven inch sealed beam lamp units which heretofore have been used extensively; that is a single lamp on each side of the vehicle as compared to the more recent development of dual headlamp systems in which two lamps are placed on each side of the vehicle as shown in FIGURE 6. However, as the description of the invention proceeds, brief reference will be made to FIGURE 6 from which it will become quite obvious that the present apparatus and method may be employed with dual or other multiple headlamp systems as well.

Referring now to FIGURES 1 and 2, there is shown an aiming screen 2 vertically positioned on a substantially level floor 4 opposite a vehicle 6 disposed at a suitable station on the floor opposite the aiming screen so that the headlamps are spaced twenty-five feet in front of the aiming screen. An electronic light-sensitive assembly is indicated generally at 8 as being affixed to the rear wall of the aiming screen, the latter being spaced forwardly of a wall 10 or any other obstruction in the factory so as to provide a clearance space for ready access to the electronic equipment. This equipment will be described hereinafter at which time it will be appreciated that it may be used in aiming the headlamps as an alternative to visual location of the light beam pattern from the respective vehicle headlamps on the aiming screen. A pair of relatively large condensing lenses 12 and 14, preferably eighteen inches in diameter and having a focal length of twenty-two feet, are positioned in front of the aiming screen 2 between the latter and the respective vehicle headlamps. Each of the condensing lenses are positioned in front of the aiming screen a distance equal to their focal lengths or twenty-two feet.

The principal optical characteristic of such a condensing lens insofar as it is pertinent to this invention is that it will function to bend light rays incident thereon from the vehicle headlamps toward its focal point on the aiming screen if the incident light rays are parallel to the optical axis of the lens. Similarly, given any particular angle of incidence between a light ray and the optical axis of such a lens, the angle of emergence will be increased by an amount equal to this incidence angle. Thus, if a given lamp is properly adjusted relative to the center line of the vehicle, the light beam projected therefrom will be directed to the proper aiming point on the screen irrespective of variation in horizontal spacing of the headlamps and variation in their vertical heights from vehicle to vehicle. This function of the condensing lens will be more clear from the description of the apparatus which follows.

Figure 3:
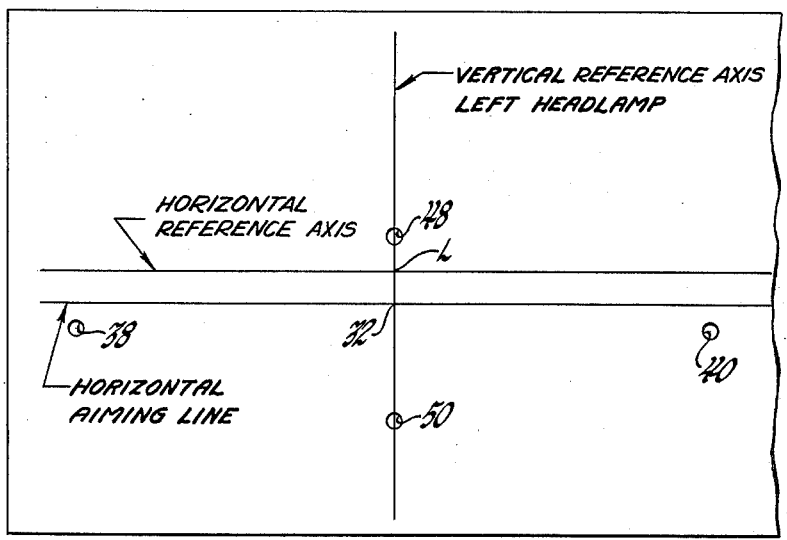
FIGURE 3 is an enlarged partial front elevation of the aiming screen of FIGURE 2 showing the coordinate reference axes thereon and horizontal aiming line for the headlamp or lamps on the left side of the vehicle.
Figure 4:
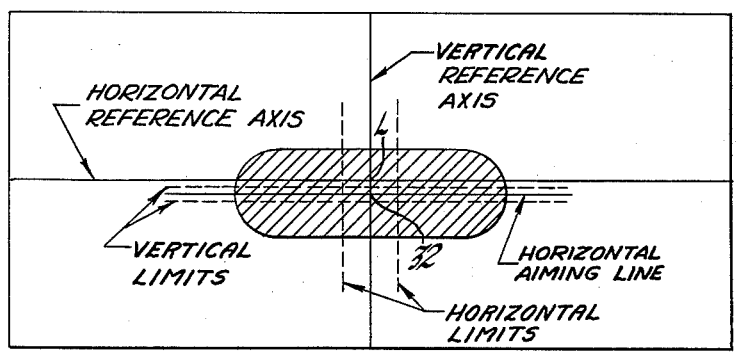
FIGURE 4 is a view corresponding to FIGURE 3 illustrating the pattern cast on the left portion of the aiming screen by the upper beam of a single or seven inch headlamp system.

The station on the level floor 4 in which successive vehicles 6 are positioned is preferably provided with suitable mounting pads or other means, not shown, insuring that the center lines of successive vehicles are aligned with a vertical reference axis 16 preferably at the midpoint of the aiming screen 2. A set of coordinate reference axes are positioned on either side of the center line axis 16 as shown in FIGURE 2, FIGURES 3 and 4 illustrating these coordinates reference axes with respect to the left side of the aiming screen and the left side of the vehicle. Each of these sets of axes includes a vertical reference axis 18 and 20 respectively for the right and left headlamps of the vehicle, and a horizontal reference axis 22 at right angles thereto.

In conventional aiming apparatus as referred to previously, the respective vertical reference axes would correspond to an axis passing through the projected center of the vehicle lamps on the left and right side of the vehicle. Consequently, these axes would be determined by the horizontal spacing between the respective lamp centers. Similarly, and again referring to conventional aiming apparatus, the horizontal reference axis would be an axis passing through the projection of the respective lamp centers on the aiming screen or, in other words, be determined by the heights of the respective lamp centers. However, according to this invention, the respective vertical and horizontal axes are determined as a function of the average location of the lamp centers of successive vehicles whose headlamps are to be aimed. In illustrating this feature of the invention, the right headlamp 24 and left headlamp 26 shown in FIGURE 2 represent the average lamp position, both as to spacing and height, for successive vehicles. To this end, the right vertical reference axis 18 and left vertical reference axis 20 are spaced to either side of the vehicle center line axis 16 on the screen a distance equal to one-half the average distance between headlamp centers for the vehicles in question. Similarly, the horizontal reference axis 22 is a measure of the vertical height or level of the average lamp center for the successive vehicles. As such, the intersection of the respective coordinate reference axes define reference points "L" and "R" as shown in FIGURE 2 corresponding to the horizontal projection of the average lamp center on the left and right side; that is, the centers of average lamps 24 and 26.

Referring now specifically to the upper beam of a conventional seven inch sealed lamp unit, it will be remembered that this beam pattern on a screen twenty-five feet from the lamp should be symmetrical. That is, approval is to be refused if the upper beam high intensity zone is more than six inches to the right or left of the respective vertical reference axes 18 and 20, or aimed higher or lower than two inches below lamp center level or the horizontal reference axis 22 within the two inch tolerance aforementioned. In view of this latter specification, it is then necessary to form a horizontal aiming line 28 parallel to and two inches below the horizontal reference axis 26. At this juncture, it should be noted that it is the usual practice in an assembly plant to make the aiming tolerances somewhat more narrow than those recommended by the Society of Automotive Engineers. However, irrespective of the tolerances desired, they may be easily incorporated into the aiming screen. When visual aiming is being accomplished, it might be desirable to form light lines as indicated by dotted line in FIGURE 4 to indicate horizontal and vertical limits to the aiming tolerances. However, when electronic aiming equipment is used in place of reliance on visual aiming, these imaginary tolerances lines are actually provided by the electronic aiming equipment as will appear more fully hereinafter.

In any event, and by referring to FIGURE 4 in particular, it will be clear that the upper beam high intensity zone of a completely properly aimed lamp would fall symmetrically vertically and horizontally about the intersections of the respective vertical reference axes 18 and 20 with the horizontal aiming line 28 thereby defining aiming points 30 and 32 for the right and left headlamps, respectively.

Each of the relatively large condensing lenses 12 and 14 is spaced in front of the aiming screen 2 and the respective coordinate axes thereon a distance equal to their focal lengths which, in this preferred instance, is twenty-two feet thereby placing the lenses three feet in front of the headlamp lenses. Consequently, any light rays falling upon the surface of the condensing lenses on the side of the vehicle headlamps and parallel to the optical axes of the condensing lenses will be bent inwardly toward the lens axis and toward a common point on the screen. Moreover, any particular portion of headlamp light rays striking the condensing lens at any given angle to the optical axis of the latter will emerge from the lens at an angle increased by an amount equal to the angle of incidence. Consequently, irrespective of the relative positioning both vertically and horizontally of the headlamps of successive vehicles, the condensing lenses will function to redirect the light rays to a corresponding common point on the aiming screen when properly aimed. To this end, each of the condensing lenses 12 and 14 has its optical center and therefore its optical axis aligned with the center of the average lamps 24 and 26 and the reference points R and L on the aiming screen as indicated by the dotted lines in FIGURE 2.

Prior to describing the light-sensitive portion of the aiming equipment, reference will be made to the operation of the aforedescribed apparatus with particular reference to FIGURES 2, 3 and 4. A particular model of vehicle 6 having a sealed beam lamp unit on the left and right sides thereof is driven into the aiming station on the level floor 4 so that the center line of the vehicle is aligned with the center line axis 16 on the aiming screen 2 and normal to the latter. At this point, it is preferable in order to obtain the most accurate aim possible that the pressure in the vehicle tires be substantially equalized and maintained so, that constant load is maintained in the cars, and that the cars be rocked sidewise to equalize the springs. The upper beams of the headlamps are then illuminated. At this time, if the relative spacings and the heights of the right and left headlamps happen to correspond to the average car on which the coordinate axes on the aiming screen have been based, these lamps would be the lamps 24 and 26 having their centers aligned with the optical center of the respective condensing lenses 12 and 14 and the reference points "L" and "R" if the lamps happen to be parallel to the aiming screen 2; that is, the light beam therefrom including incident rays parallel to the lens axes will concentrate on points "L" and "R" if the lamps are optically perfect. The objective then is to adjust the respective vehicle headlamps so that the upper beam pattern thereof will be disposed on the aiming screen as shown in FIGURE 4. To this end, the average lamp would be first adjusted vertically with respect to the aiming points 30 or 32 until such time as the upper and lower limits of the high intensity zone of the beam fell within the tolerance area as indicated in FIGURE 4. In the example given, no adjustment would be required horizontally because the left and right edges of the high intensity zone would already fall within the horizontal tolerance limits indicated in FIGURE 4.

Referring now, for example, to the left headlamp whose desired pattern is shown in FIGURE 4, let it be assumed that the spacing of the left and right headlamps are other than that of the average lamps 24 and 26. Under such circumstances, the centers of the lamps would not correspond with the reference points "L" and "R" and, moreover, the lamp centers would not be aligned with the optical centers of the condensing lenses 12 and 14. However, irrespective of the location of the lamp centers relative to the headlamp reference and aiming points on the screen and the optical centers of the condensing lenses, it will be readily apparent that the condensing lenses will function to bend the light rays of a selected portion of the beam, such as the high intensity zone thereof, toward the aiming points thereby concentrating the high intensity beam zone within the tolerance area of FIGURE 4 when the lamps are correctly aimed using the procedure aforementioned. In other words, the object is to adjust the headlamps so as to project their light beams in a given direction forwardly and downwardly relative to the axis of the vehicle so that they meet the aforementioned specifications. Thus, referring to FIGURE 4, even though the left headlamp center is laterally or vertically displaced from the position of the average lamp 26 or both, it may be tilted in vertical and horizontal planes until such time as its high intensity zone falls within the tolerance area relative to aiming point. Therefore, the lamp is adjusted to a proper position relative to the vehicle axis while the lens 14 condenses the light rays so that a fixed screen may be employed.

As aforementioned, the fact that the upper beam high intensity zone of the respective lamps falls within the tolerance area as indicated in FIGURE 4 may be visually observed. However, to remove as much human error as possible from this aiming method, it is preferable that the previously referred to electronic light-sensitive aiming equipment 8 be provided. That portion of this electron aiming equipment associated with the left headlamp side of the aiming screen is shown in FIGURE 5, it being understood that a counterpart of this equipment is also associated with the right headlamp side of the aiming screen. Referring now to FIGURE 5, each of these assemblies may be seen to include a pair of horizontally spaced light-sensitive devices such as photocells 34 and 36 having their light responsive elements exposed to the headlight beam through suitable apertures 38 and 40 in the aiming screen as indicated in FIGURE 3. Moreover, these photocells are connected in a suitable circuit to a horizontal null detector as indicated in FIGURE 5 which, in turn, is electrically connected to the horizontal aim signal light 42. Similarly, a pair of vertically spaced photocells 44 and 46 (shown out of vertical alignment) have their light responsive elements exposed to the headlamp beams through suitable apertures 48 and 50 in the aiming screen as shown in FIGURE 3. These photocells are, in turn, electrically connected to the vertical null detector which controls the signal lamp 52 in FIGURE 5.

This type of aiming apparatus is quite conventional, and therefore further description appears to be unnecessary. Suffice it to say that this apparatus functions to properly locate the light beam by balancing the intensity of light impinging on the vertical aiming cells 44 and 46 and horizontal aiming cells 34 and 36 at the time of correct aim. Consequently, these aiming cells are positioned on the aiming screen relative to the location desired for the high intensity zone of the upper beam pattern within the tolerances desired. At the time of correct aim being achieved, as indicated in FIGURE 4, the output from the respective pairs of photocells are balanced thereby providing a signal to the respective vertical and horizontal null detectors that a good "null" has been accomplished thereby lighting the respective signal lamps. At this time, the operator of the aiming station knows that the headlamps are aimed within the desired tolerance area and the aiming procedure is ended.

With respect to seven inch sealed lamp units, the lower beams thereof are not aimed. The reason for this is, as is well known by those acquainted with this art, that such lamps typically include upper and lower beam elements which are located as accurately as possible within the lamp envelope comprising an all-glass lens and reflector unit fused together at their periphery. The reflector element is used to impart directional control to the light beam from the lamp, while the lens element is suitably fluted or formed with prism elements to provide distributional control. The upper beam filament is placed substantially at the focal point of the reflector element of the lamp while the lower beam filament is placed slightly off focus. Thus, upon proper aim being achieved on upper beam, the lower beam filament is located accurately enough relative to the upper beam filament so that proper aim thereof naturally follows. To this end it should be herein noted that the aim of lower beam pattern is such that the higher intensity portion of the pattern will fall substantially within the lower right hand quadrant of the reference axes shown in FIGURE 4.

Referring now to FIGURE 6, there is shown almost the identical arrangement of the apparatus shown in FIGURE 2, except for slight modification thereof to enable the aiming of dual headlamp systems. The principal difference between the apparatus and arrangement of FIGURE 6 and that of FIGURE 2 resides in, first, selection of the vertical and horizontal reference axes of each set of coordinate axes and, secondly, the fact that a different lamp unit is used for both the upper and lower beam thereby necessitating aim of both beams.

Prior to describing the apparatus of FIGURE 6, it would appear helpful to describe briefly the nature of the modern development of dual headlighting systems. Such systems include a pair of dual headlights on each of the front fenders of the vehicle. Each pair of headlamps comprises what is now commonly referred to as a Type I and a Type II unit. These lamps are each five and three-quarters inch in diameter and include an all-glass reflector and lens element to impart, respectively, directional and distributional control of the light beams emanating from the lamps as aforedescribed with respect to seven inch lamps. However, in order to give more accurate aim of the upper and lower beams, a different arrangement of filaments are provided in these types of units. Referring to the previous description of the seven inch headlamp, it will be remembered that the filaments thereof include one which is off-focus of the reflector. In such headlamps, there consequently is always a compromise between the upper and lower beam filaments in view of the fact that one filament is off focus with respect to the reflector, and the fluting or other elements on the lens imparting distributional control of the lamp must accommodate both beams. This is one of the major factors which led to the development of dual headlighting systems.

Therefore, in dual headlighting systems, the Type I unit includes only one filament, which is an upper beam filament, located at the focal point of the lamp reflector. The Type II unit, on the other hand, has two filaments as in the previously well known seven inch unit. However, in the Type II unit, the lower beam filament is placed at the focal point of the reflector while an auxiliary upper beam filament is slightly displaced from the reflector focal point. The lens of the Type I unit is designed for the upper beam filament, while the lens of the Type II unit is designed for the lower beam filament. When the vehicle headlamps are on high beam, the Type I and Type II units are both illuminated. The upper beam high intensity zone is provided by the Type I unit which has its filament on the reflector focus, while the body light surrounding the high intensity area of the upper beam is provided by the off-focus filament of the Type II unit. When the lamps are on low beam, only the Type II unit is illuminated and, at that, only the lower beam filament thereof which is on the reflector focal point.

In FIGURE 6, the numerals 24' and 26' depict, respectively, pairs of laterally spaced headlamps for the right and left side of a vehicle. Similar to FIGURE 2, these headlamps represent the average location of the headlamps of the vehicles in question. Moreover, the midpoints between the respective pairs of headlamps are indicated at "A" and "B," respectively, for the right and left pairs. It will be seen that the aiming screen 2' includes a vehicle center line axis 16' as before, and pairs of coordinate reference axes to either side thereof. These coordinate axes include a right vertical reference axis 18' and left vertical reference axis 20' and a horizontal reference axis 22' intersecting the vertical axes at the points "L'" and "R'." However, inasmuch as laterally spaced dual headlamps are now to be aimed, the respective vertical axes are spaced from the vehicle center line axis 16', a distance equal to one-half of the average lateral spacing of the mid-points "A" and "B" between the lamp units. The horizontal reference axis is determined as before as being the average of the vertical heights of the dual headlamps of successive cars. The intersections "L'" and "R'" of the respective vertical reference axes with the horizontal reference axis then would correspond to the horizontal projection of the mid-points "B" and "A" between the Type I and Type II units of the average car. A horizontal aiming line 28' based on the aiming specification for the symmetrical upper beam from the Type I unit is then drawn parallel to and below the horizontal reference axis as aforedescribed. The intersections of the horizontal aiming line with the respective vertical axes then define aiming points 30' and 32' with respect to which the Type I unit may be aimed in the manner described relative to a single lamp. The condensing lenses 12' and 14' are then positioned as before with their optical centers on the axes of points "A" and "R'" and "B" and "L'" at a distance from the screen equal to their focal lengths.

The aiming screen is provided with electronic aiming equipment including a group of photocells arranged as described before with reference to FIGURES 3 and 5 for sensing the upper beam high intensity zone provided by the Type I unit. In addition, however, two additional photocells are provided behind the apertures 54 and 56 in the aiming screen to establish a tolerance area for the high intensity zone of the lower beam filament of the Type II unit.

The aiming procedure to be used with dual headlamps is substantially identical to that previously described with respect to the single lamp system. The high intensity zone of the upper beam of each pair of headlamps is first aimed until a pattern such as generally shown in FIGURE 4 is provided. However, during this aiming operation, the Type II unit of each pair of headlamps is covered with a black cloth or otherwise to prevent the body light from its off-focus upper beam filament from being projected onto the screen. In this way, the upper beam high intensity zone which is provided by the on-focus single filament Type I unit is accurately aimed. Thereafter, the lamps are put on lower beam which corresponds to turning off the Type I unit, all light being provided by the on-focus lower beam filament of the Type II unit. The lamps are then adjusted in a manner similar to that previously described until such time as the high intensity zone of the lower beam pattern from the Type II unit is disposed within the tolerance area substantially within the lower right hand quadrant of the aiming screen coordinate axes.

From the above description, it will be seen that this invention contemplates a very simple type of apparatus which can be used to accurately aim either single, dual or other multiple headlamp systems of successive vehicles in which headlamp position varies. In this regard, the factory need only be provided with two aiming screens; one for single headlamp systems and one for dual headlamp systems in which the coordinate reference axes have been determined as aforedescribed. It has been found that in both situations headlamp positions can vary within plus or minus five inches using a condensing lens of the type specifically referred to above while still achieving requisite accuracy of aim.

It should be noted that the apparatus and method herein disclosed may be used with other dual headlamp arrangements such as one in which the lamps of each pair are vertically spaced or vertically spaced and laterally offset. It is only necessary to determine reference points on the aiming screen as a function of the average position of the midpoint between lamp centers from the vehicle centerline as aforementioned, and align the optical center of the condensing lens with this point. With respect to clusters of more than two lamps, it should also be apparent that the same technique may be employed.

Although but a relatively simple condensing lens is preferably used with this apparatus, it should be quite apparent that optical equivalents thereof may be employed for the same purpose. For example, in the interest of economy of space, it might be desirable to substitute a more complex optical equivalent for the simple condensing lenses of this apparatus thereby enabling the spacing between the aiming screen and the vehicle to be shortened. In any event, it will be apparent to those skilled in the art that there are many equivalent forms of this type of apparatus and that, therefore, the preferred form shown is merely for illustrative purposes and in no way is intended to limit the scope of the invention which is defined by the claims which follow.

We claim:

1. Apparatus for aiming the headlamps of successive vehicles in which the headlamp positions thereof vary, said apparatus comprising an aiming screen having a datum axis, a station opposite said screen in which successive vehicles may be positioned with the center lines thereof aligned with said datum axis, vertical and horizontal reference axes on said screen on each side of said datum axis and intersecting to define reference points, said vertical and horizontal axes being determined, respectively, by the average horizontal spacing and vertical height of the headlamps of said successive vehicles, and a relatively large condensing lens positioned between each of said reference points and said vehicle headlamps, each of said lenses being spaced in front of said reference points a distance equal to its focal length and having its optical center aligned with its respective reference point, whereby substantially parallel light rays from said headlamps entering said lenses will be condensed toward said respective reference points.

2. Apparatus for aiming laterally spaced dual lamps of successive vehicles in which the headlamp positions vary, said apparatus comprising an aiming screen having a datum axis, a station opposite said screen in which successive vehicles may be positioned with the center lines thereof aligned with said datum axis, vertical and horizontal reference axes on said screen on each side of said datum axis and intersecting to define reference points, said vertical reference axes being spaced from said datum axis a distance substantially equal to one half the average distance between the mid-points of the respective sets of dual lamps, said horizontal axis being at a height substantially equal to the average height of said dual lamps, and a relatively large condensing lens positioned between each of said reference points and said vehicle dual lamps, each of said lenses being spaced in front of its respective reference point a distance equal to its focal length and having its optical center aligned with its respective reference point, whereby substantially parallel light rays from each of said dual lamps entering said lenses will be condensed toward said respective reference points.

References Cited in the file of this patent

UNITED STATES PATENTS

| | | |
|---|---|---|
| 1,456,150 | Ricker | May 22, 1923 |
| 1,491,962 | Moody | Apr. 29, 1924 |
| 1,705,356 | Bohner | Mar. 12, 1929 |
| 1,712,147 | Kelsea | May 7, 1929 |
| 2,162,010 | Graham | June 13, 1939 |
| 2,552,116 | Rodeghiero | May 8, 1951 |

FOREIGN PATENTS

| | | |
|---|---|---|
| 782,269 | Great Britain | Sept. 4, 1951 |
| 1,046,000 | France | Dec. 2, 1953 |